US009560625B2

(12) United States Patent
Chen et al.

(10) Patent No.: US 9,560,625 B2
(45) Date of Patent: Jan. 31, 2017

(54) METHOD AND APPARATUS FOR CONFIGURING MOBILE RELAY NODE TRACKING AREA AND LOCATION UPDATE

(71) Applicant: ZTE CORPORATION, Shenzhen, Guangdong (CN)

(72) Inventors: Lin Chen, Shenzhen (CN); Li Chu, Shenzhen (CN)

(73) Assignee: ZTE Corporation (CN)

( * ) Notice: Subject to any disclaimer, the term of this patent is extended or adjusted under 35 U.S.C. 154(b) by 187 days.

(21) Appl. No.: 14/373,091

(22) PCT Filed: Jan. 18, 2013

(86) PCT No.: PCT/CN2013/070653
§ 371 (c)(1),
(2) Date: Oct. 28, 2014

(87) PCT Pub. No.: WO2013/107375
PCT Pub. Date: Jul. 25, 2013

(65) Prior Publication Data
US 2015/0148062 A1 May 28, 2015

(30) Foreign Application Priority Data
Jan. 18, 2012 (CN) .......................... 2012 1 0016306

(51) Int. Cl.
*H04W 64/00* (2009.01)
*H04W 60/00* (2009.01)
*H04W 84/04* (2009.01)

(52) U.S. Cl.
CPC ........... *H04W 64/003* (2013.01); *H04W 60/00* (2013.01); *H04W 84/047* (2013.01)

(58) Field of Classification Search
CPC ... H04W 60/00; H04W 64/003; H04W 84/047
See application file for complete search history.

(56) References Cited

U.S. PATENT DOCUMENTS

| 8,175,598 | B2 | 5/2012 | Kubo et al. |
| 8,837,325 | B2 | 9/2014 | Zhang et al. |

(Continued)

FOREIGN PATENT DOCUMENTS

| CN | 102118808 A | 7/2011 |
| CN | 102223603 A | 10/2011 |

(Continued)

OTHER PUBLICATIONS

R3-112897—Discussion on the Architecture of Mobile Relay, Nov. 2011.*

(Continued)

*Primary Examiner* — William Nealon
(74) *Attorney, Agent, or Firm* — Brooks Kushman P.C.

(57) ABSTRACT

A method and apparatus for mobile relay node tracking area configuration and location update. The method includes: configuring a dedicated tracking area for a Donor eNodeB (DeNB); configuring a dedicated tracking area for a mobile Relay Node (RN) accessing the DeNB; when a terminal (UE) accessing the mobile RN registers or tracking area updates, allocating a tracking area identifier list containing the dedicated tracking area to the UE; the dedicated tracking area is a tracking area code dedicated to a mobile relay. The method and apparatus try the best to guarantee that a paging area list allocated to the UE contains the tracking area configured for the mobile relay serving the UE, thereby avoiding that numerous UEs served by the RN trigger location update simultaneously in the process of the RN moving.

17 Claims, 5 Drawing Sheets

(56) References Cited

U.S. PATENT DOCUMENTS

| | | | | |
|---|---|---|---|---|
| 2010/0029298 A1* | 2/2010 | Iwamura | ............... | H04J 11/0069 455/456.1 |
| 2010/0311419 A1* | 12/2010 | Bi | ................... | H04W 60/00 455/435.1 |
| 2011/0044309 A1* | 2/2011 | Ye | ................... | H04W 68/08 370/338 |
| 2012/0039246 A1* | 2/2012 | Zhang | ................ | H04W 68/02 370/315 |
| 2013/0003644 A1 | 1/2013 | Iwamura et al. | | |
| 2013/0100929 A1 | 4/2013 | Liu et al. | | |
| 2013/0344890 A1* | 12/2013 | Hahn | ................. | H04W 60/00 455/456.1 |
| 2014/0051442 A1 | 2/2014 | Yang et al. | | |

FOREIGN PATENT DOCUMENTS

| | | |
|---|---|---|
| CN | 102300190 A1 | 12/2011 |
| CN | 102300280 A | 12/2011 |
| EP | 2129141 | 12/2009 |
| EP | 2387279 | 11/2011 |
| EP | 2725833 A1 | 4/2014 |
| JP | 2010245713 | 10/2010 |
| JP | 2011142593 A | 7/2011 |
| JP | 2011166595 | 8/2011 |
| WO | 2010089949 | 8/2010 |
| WO | 2010124458 | 11/2010 |

OTHER PUBLICATIONS

R3-112861 Scenario and Requirements for Mobile Relay, Nov. 2011.*

Extended European Search Report for European Application No. 13738445.9, Completed by the European Patent Office, Dated Oct. 13, 2015, 14 Pages.

LG Electronics Inc. 3GPP TSG-RAN WG3 Meeting No. 74, R3-112917, Nov. 14-18, 2011, 2 Pages, "Clarification on the TAU Procedure for Mobile Relay".

PCT International Search Report Dated Apr. 18, 2013, Application No. PCT/CN/2013/070653, 4 Pages.

Partial Supplementary European Search Report for European Application No. EP 13738445.9, Completed by the European Patent Office, Dated Jun. 26, 2015, 7 Pages.

3GPP TSG-RAN WGS Meeting No. 74, Nov. 14-18, 2011, R3-112861, Nokia Siemens Networks, "Further discussion on scenario and requirments for mobile relays."

3GPP TSG-RAN WG3 Meeting No. 75, Feb. 6-10, 2012, R3-120027, ZTE. "Mobile relay architecture comparison from the perspective of TAU."

3GPP TSG RAN WG3 Meeting No.75bis, Mar. 26-30, 2012, R3-120636, New Postcom, "TA configuration for Mobile Relay."

* cited by examiner

METHOD AND APPARATUS FOR CONFIGURING MOBILE RELAY NODE TRACKING AREA AND LOCATION UPDATE

CROSS-REFERENCE TO RELATED APPLICATIONS

This application is a U.S. national phase of PCT Application No. PCT/CN2013/070653 filed Jan. 18, 2013, which claims priority to Chinese Application No. 201210016306.7 filed Jan. 18, 2012, the disclosures of which are incorporated in their entirety by reference herein.

TECHNICAL FIELD

The present document relates to the wireless communication technology field, and in particular, to a method and apparatus for tracking area configuration and location update of a mobile relay node.

BACKGROUND OF THE RELATED ART

In order to meet the demand of large bandwidth and high speed mobile access increasing day by day, the Third Generation Partnership Projects (abbreviated as 3GPP) brings out the Long-Term Evolution advance (abbreviated as LTE-Advanced) standard. The LTE-Advanced reserves the core of the Long-Term Evolution (abbreviated as LTE) for the evolution of the LTE, and on that basis adopts a series of technologies to extend a frequency domain and a space domain, so as to achieve the purposes, such as improving the spectral efficiency, increasing the system capacity, etc.

A wireless relay technology is one of the LTE-Advanced technologies, aimed at extending the coverage area of a cell, reducing the dead corner area in communication, balancing the load, transferring services of the hot spot area and saving the transmission power of a User Equipment (abbreviated as UE). A Relay Node (abbreviated as RN) provides functions and services similar to a common eNB to the UE which accesses the cell of the RN, and accesses, through a wireless interface and in a manner that the RN is similar to a common UE, to one eNB which serves the RN, wherein the eNB which serves the RN is called a Donor eNB, abbreviated as DeNB. The DeNB is connected with a Mobility Management Entity (abbreviated as MME). Functions that the MME provides for the UE include: processes of control signalings, such as, user access control, authentication, data encryption, service bearer control, paging, handover control, etc. Multiple MMEs serve a public geographical area together, and in the geographical area, the eNB and/or the DeNB (hereafter referred to as eNB/DeNB) connect to the multiple MMEs in that geographical area with a net structure. A set of MMEs in that public geographical area forms a MME pool, and the area is also called as a MME pool area, corresponding to several tracking areas (abbreviated as TA); and the UE does not need to change the served MME when moving in these tracking areas.

As the high-speed railway is built and put into operation on a large scale, the demand for communicating on a train is increasing constantly. The practical speed of the high-speed railway has already reached 350 kilometers per hour at present, and it is very difficult that the coverage of base stations in the existing network meets communication quality demand of the high-speed railway by suffering the influence, such as, Doppler frequency shift, cell handover frequently, high penetration loss of the high-speed railway carriage, etc. So the industry proposes deploying the relay node on the high-speed railway, as shown in FIG. 1, which lets users, such as UE1 and UE2, in the high-speed railway train directly communicate with the RN which is rest relative to the UEs, and the RN can perform handover among different DeNBs in the process of the high-speed railway moving, thereby avoiding the simultaneous handover of a large number of users in the carriage of the high-speed railway and guaranteeing the communication quality between the UEs and the RN. In addition, by enhancing the backbone connection between the mobile RN and the DeNBs, it can better solve the above-mentioned problem existed in the high-speed railway. But the introduction of the mobile RN will produce a great impact on the relevant standard of the RN in the existing LTE-Advanced.

For example, for an RN cell, an Operation and Maintenance (OAM) entity usually configures information of a TA area to which the cell belongs, and the RN cell broadcasts the TA to which the cell belongs in a form of Tracking Area Code (TAC) in a System Information Block Type1 (SIB1). On the other hand, after starting up, the UE can only accept the services after registering to the network at first; in the process of registering, the MME that the UE connects allocates a tracking area identification list (TAI list) for the UE, wherein the tracking area identification includes a Public Land Mobile Network (PLMN) identification and a TAC. If the UE selects or re-selects one RN cell, and finds that the TA to which the RN cell belongs is not in the TAI list registered by the UE according to the SIB1 message broadcasted by the RN, then the UE needs to perform a process of Tracking Area Update (abbreviated as TAU) to inform the MME about the current location and update the registered TAI list correspondingly. When there are arrived downlink data corresponding to the UE, the MME of the UE can send a paging message to all eNB/DeNBs covered by the tracking area included in the list according to the TAI list of the UE. After receiving the paging message, the eNB/DeNB judges one by one whether the TA of each cell (including the RN cell) is consistent with the TAI information included in the TAI list, and if yes, then pages the UE by the paging message through an air interface on the corresponding cell. Once receiving the corresponding paging message at the air interface, the UE performs a service request process, and transfers to a connection state. After the process is finished, the S-GW sends the data to the eNB currently connected to the UE and the UE.

In the process of the RN moving, how to configure the TAC of the RN and how to keep accordance with the current connected DeNB need to be reconsidered; if the configuration is improper, it will cause new problems related to the tracking area update of the mobile relay and the paging. For example, in the process of the RN moving, if the TAC of the RN changes with the change of the TAC of the target DeNB, this will cause that, in the process of the RN moving, the UE served by the RN constantly detects that the TA of the RN is inconsistent with the TAI list registered by the UE, thus a large amount of UEs perform the TAU at the same time, which leads to signaling block. On the other hand, under a scenario that the TAC of the RN maintains unchanged in the whole movement process while the DeNB does not include the TA of the RN, the MME which serves the UE does not probably know the TA to which the new RN served by the DeNB belongs, and it does not send the paging information to the DeNB, thereby being unable to page the UE.

Content of the Invention

Embodiments of the present document provide a method and apparatus for mobile relay tracking area configuration and location update, which avoids that numerous UEs served by the RN trigger the location update simultaneously in the process of the RN moving.

The embodiment of the present document provides a method for mobile relay node (RN) tracking area configuration and location update, comprising:
configuring a dedicated tracking area for a Donor eNodeB (DeNB);
configuring a dedicated tracking area for a mobile RN accessing the DeNB;
when a terminal (UE) accessing the mobile RN registers or tracking area updates, allocating a tracking area identifier list containing the dedicated tracking area to the UE;
wherein, the dedicated tracking area is a tracking area code dedicated to a mobile relay.

The embodiment of the present document further provides a method for mobile relay node (RN) tracking area configuration and location update, comprising:
configuring a dedicated tracking area for a mobile RN served as a base station; wherein, the dedicated tracking area is a tracking area code dedicated to a mobile relay;
when a terminal (UE) accessing the mobile RN registers or tracking area updates, allocating a tracking area list containing the dedicated tracking area identifier to the UE; and
when a tracking area configured for each cell of a target donor eNodeB (DeNB) accessed by the mobile RN does not contain the dedicated tracking area configured for the mobile RN, the target DeNB updating tracking area information of the DeNB maintained by a mobile management entity (MME).

The embodiment of the present document further provides a method for mobile relay node (RN) tracking area configuration and location update, comprising:
configuring for a mobile RN a tracking area same as a donor base station (DeNB) cell accessed by the mobile RN; and
when a terminal (UE) accessing the mobile RN registers or tracking area updates, a mobile management entity (MME) of the UE allocating to the UE a tracking area identifier list containing tracking areas of all the DeNB cells along the moving trace of the mobile RN.

The embodiment of the present document further provides an apparatus for mobile relay node (RN) tracking area configuration and location update, comprising a first configuration module, a second configuration module and a third configuration module, wherein,
the first configuration module is configured to configure a dedicated tracking area for a Donor eNodeB (DeNB);
the second configuration module is configured to configure a dedicated tracking area for a mobile RN accessing the DeNB;
the third configuration module is configured to, when a terminal (UE) accessing the mobile RN registers or tracking area updates, allocate a tracking area identifier list containing the dedicated tracking area to the UE;
wherein, the dedicated tracking area is a tracking area code dedicated to a mobile relay.

The embodiment of the present document further provides an apparatus for mobile relay node (RN) tracking area configuration and location update, comprising a fourth configuration module, a fifth configuration module and an update module, wherein,
the fourth configuration module is configured to configure a dedicated tracking area for a mobile RN served as a base station; wherein, the dedicated tracking area is a tracking area code dedicated to a mobile relay;
the fifth configuration module is configured to: when a terminal (UE) accessing the mobile RN registers or tracking area updates, allocate a tracking area identifier list containing the dedicated tracking area to the UE; and
the update module is configured to: when determining that a tracking area configured for each cell of a target donor eNodeB (DeNB) accessed by the mobile RN does not contain a tracking area configured for the mobile RN, make the target DeNB update tracking area information of the DeNB maintained by a mobile management entity (MME).

The embodiment of the present document further provides an apparatus for mobile relay node (RN) tracking area configuration and location update, comprising an eighth configuration module and a ninth configuration module, wherein,
the eighth configuration module is configured to configure for a mobile RN a tracking area same as a donor base station (DeNB) cell accessed by the mobile RN; and
the ninth configuration module is located in a mobile management entity (MME) of a terminal (UE) accessing the mobile RN, and configured to: when the UE registers or tracking area updates, allocate to the UE a tracking area identifier list containing tracking areas of all the DeNB cells along the moving trace of the mobile RN.

The method and apparatus of the embodiment of the present invention try the best to guarantee that the paging area identifier list allocated to the UE includes the tracking area configured for the mobile relay serving the UE, which avoids that numerous UEs served by the RN trigger location update simultaneously in the process of the RN moving. In addition, when the RN performs handover, the tracking area configuration information of each RN or DeNB cell maintained by the MME is updated if necessary, thereby guaranteeing that the TA configuration information of an air interface network keeps consistent, and guaranteeing the correct paging route.

PREFERRED EMBODIMENTS OF THE PRESENT INVENTION

The embodiments of the present document are described in detail in combination with the accompanying drawings hereinafter. It should be illustrated that, in the case of not conflicting, the embodiments in the present application and features in these embodiments can be combined with each other.

Embodiment 1

Figure 1:
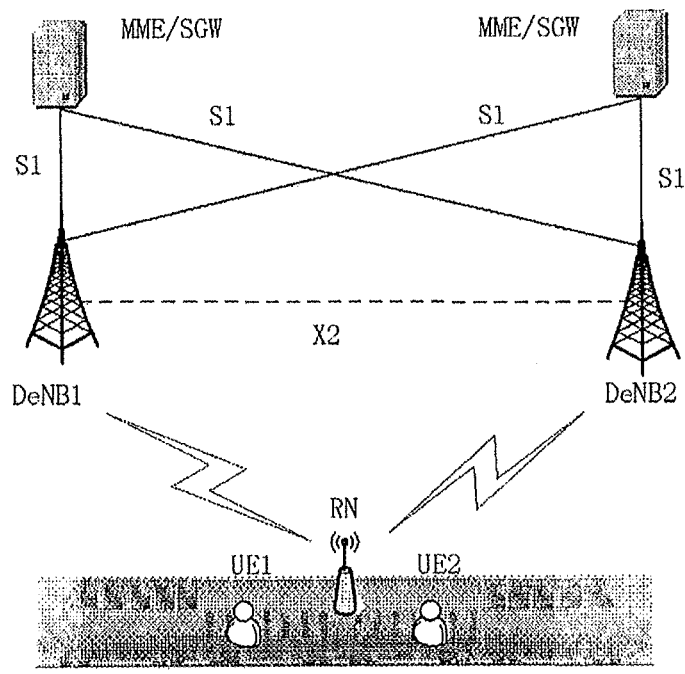
FIG. 1 is a schematic diagram of a relay node performing handover between different DeNBs.
Figure 2:
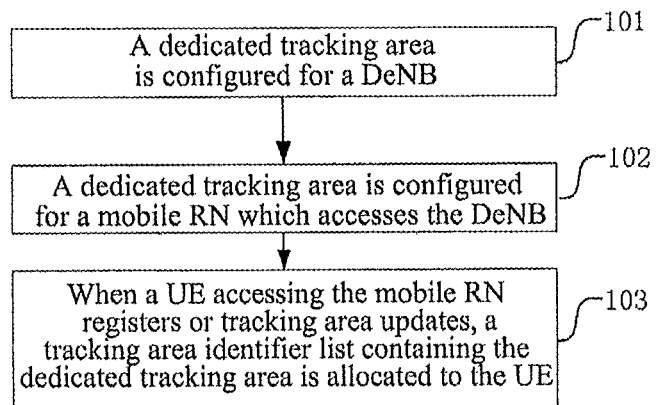
FIG. 2 is a flow chart of an embodiment 1 of the present document.

The method for mobile relay tracking area configuration and location update of the present embodiment, as shown in FIG. 2, includes the following steps.

In step 101, a dedicated tracking area is configured for a DeNB, wherein, the dedicated tracking area is a tracking area code dedicated to a mobile relay node.

Preferably, the DeNB can obtain a tracking area configuration parameter from a network management system of the DeNB, and the tracking area configuration parameter corresponds to the dedicated tracking area.

In step 102, a dedicated tracking area is configured for a mobile RN which accesses the DeNB.

Preferably, the RN can obtain a tracking area configuration parameter from a network management system of the RN, and the tracking area configuration parameter corresponds to the dedicated tracking area.

In step 103, when a UE accessing the mobile RN registers or tracking area updates, a tracking area identifier list containing the dedicated tracking area is allocated to the UE.

Preferably, an MME of the UE determines that the tracking area of a cell accessed by the UE currently is the dedicated tracking area, then the tracking area identifier list that the MME allocates to the UE contains the dedicated tracking area.

In the present embodiment, the DeNB, the RN and the UE all configure the tracking area identifier list containing the same dedicated tracking area, therefore, both the RN and the UE do not perform the location update when the RN moves.

Figure 3:
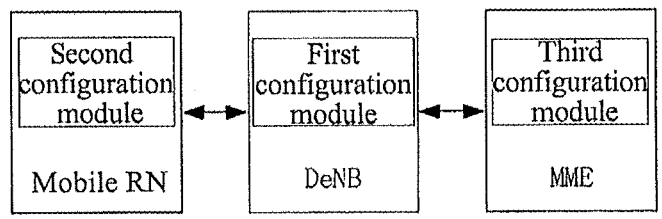
FIG. 3 is a structure diagram of an apparatus of an embodiment 1 of the present document.

The apparatus realizing the above-mentioned method, as shown in FIG. 3, includes a first configuration module, a second configuration module and a third configuration module, wherein:

the first configuration module is configured to configure a dedicated tracking area for a DeNB;

the second configuration module is configured to configure a dedicated tracking area for a mobile RN which accesses the DeNB; and the third configuration module is configured to, when a UE accessing the mobile RN registers or tracking area updates, allocate a tracking area identifier list containing the dedicated tracking area to the UE.

Preferably, the first configuration module is located in the DeNB and configured to configure the dedicated tracking area for the DeNB by adopting the following way: obtaining a tracking area configuration parameter from a network management system of the DeNB, wherein, the tracking area configuration parameter corresponds to the dedicated tracking area.

Preferably, the second configuration module is located in the mobile RN and configured to configure the dedicated tracking area for the mobile RN by adopting the following way: obtaining a tracking area configuration parameter from a network management system of the RN, wherein, the tracking area configuration parameter corresponds to the dedicated tracking area.

Preferably, the third configuration module is located in the MME of the UE and configured to allocate a tracking area identifier list containing the dedicated tracking area to the UE by adopting the following way: determining that the tracking area of a cell accessed by the UE currently is the dedicated tracking area, then the tracking area identifier list allocated to the UE containing the dedicated tracking area.

Embodiment 2

Figure 4:
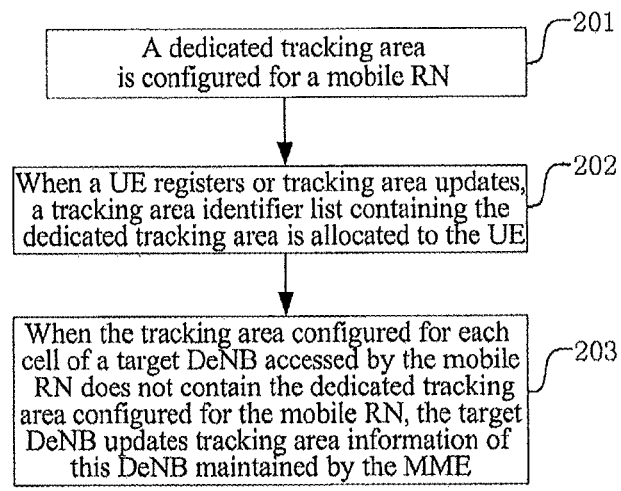
FIG. 4 is a flow chart of an embodiment 2 of the present document.

The present embodiment provides another method for mobile relay tracking area configuration and location update, as shown in FIG. 4, including the following steps:

In step 201, a dedicated tracking area is configured for a mobile RN served as a base station; wherein, the dedicated tracking area is a tracking area code dedicated to a mobile relay.

Preferably, when the mobile RN registers as a terminal identity, the MME allocates a tracking area identifier list to the mobile RN by adopting one of the following ways: the MME allocates the tracking area identifier list to the mobile RN according to the location of a DeNB accessed by the mobile RN currently; or, the tracking area identifier list allocated by the MME to the mobile RN contains the tracking areas of all the DeNB cells along the moving trace of the module RN. The DeNBs that are along the moving trace of the mobile RN and accessed by the mobile RN are configured with a same MME pool or an overlapped MME pool.

In step 202, when the UE accessing the mobile RN registers or tracking area updates, a tracking area identifier list containing the dedicated tracking area is allocated to the UE.

The allocation can be performed by adopting the following method: the MME of the UE determining that a tracking area of a cell accessed by the UE currently is the dedicated tracking area, then the tracking area identifier list allocated by the MME to the UE containing the dedicated tracking area.

In step 203, when a tracking area configured for each cell of a target DeNB accessed by the mobile RN does not contain the dedicated a tracking area configured for the mobile RN, the target DeNB updates tracking area information of the DeNB maintained by the MME.

Specifically, the target DeNB obtains the tracking area information configured for the mobile RN, and then judges whether the tracking area of each cell contains the dedicated tracking area information configured for the mobile RN according to that information. Preferably, the target DeNB can acquire the tracking area information configured for the mobile RN by adopting the following way: at a handover preparation phase of the mobile RN, a source DeNB sending tracking area information configured for the mobile RN to the target DeNB; or, the mobile RN sending the tracking area information configured for the mobile RN to the target DeNB when setting up an S1 interface or an X2 interface.

The above-mentioned tracking area information configured for the mobile RN refers to the tracking area information configured for the mobile RN by the OAM.

In the present embodiment, the RN and the UE configure the tracking area identifier lists containing the same dedicated tracking area, therefore, the UE will not perform the location update when the RN moves.

Figure 5:
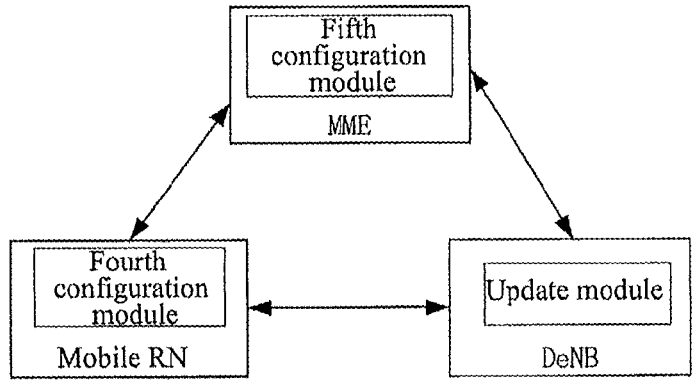
FIG. 5 is a structure diagram of an apparatus of an embodiment 2 of the present document.

The apparatus realizing the above-mentioned method, as shown in FIG. 5, includes a fourth configuration module, a fifth configuration module and an update module, wherein, the fourth configuration module is configured to configure a dedicated tracking area for a mobile RN served as a base station;

the fifth configuration module is configured to: when a UE accessing the mobile RN registers or tracking area updates, allocate a tracking area identifier list containing the dedicated tracking area to the UE; and the update module is configured to: when determining that the tracking area configured for each cell of a target DeNB accessed by the mobile RN does not contain the dedicated tracking area configured for the mobile RN, make the target DeNB update tracking area information of the DeNB maintained by an MME.

Figure 6:
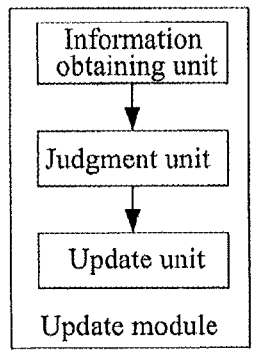
FIG. 6 is a structure diagram of an update module of an embodiment 2 of the present document.

Preferably, as shown in FIG. 6, the update module includes an information obtaining unit, a judgment unit and an update unit, wherein, the information obtaining unit is configured to acquire tracking area information configured for the mobile RN by adopting the following way: at a handover preparation phase of the mobile RN, acquiring the tracking area information configured for the mobile RN from a source DeNB; or, obtaining the tracking area information of the mobile RN from the mobile RN when setting up an S1 interface or an X2 interface by the mobile RN;

the judgment module is configured to: according to the information obtained from the information obtaining unit, judge whether the tracking area configured for each cell of the target DeNB accessed by the mobile RN contains the dedicated tracking area configured for the mobile RN; and the update unit is configured to: when the judgment module determines that the tracking area configured for each cell of the target DeNB accessed by the mobile RN does not contain the dedicated tracking area configured for the mobile RN, make the target DeNB update the tracking area information of the DeNB maintained by the MME.

Preferably, the above-mentioned apparatus further includes a sixth configuration module, which is located in the MME and configured to: when the mobile RN registers as a terminal identity, allocate a tracking area identifier list to the mobile RN by adopting one of the following ways: allocating the tracking area identifier list to the mobile RN according to a location of a DeNB accessed by the mobile RN currently; or, the tracking area identifier list allocated to the mobile RN containing tracking areas of all the DeNB cells along the moving trace of the RN.

Preferably, the above-mentioned apparatus further comprises a seventh configuration module, which is configured to configure a same MME pool or an overlapped MME pool for DeNBs that are along the moving trace of the mobile RN and accessed by the mobile RN.

Preferably, the fifth configuration module is located in the MME, and configured to allocate a tracking area identifier list containing the dedicated tracking area to the UE by the following way: determining that a tracking area of a cell accessed by the UE currently is the dedicated tracking area, then allocating to the UE the tracking area identifier list containing the dedicated tracking area.

Embodiment 3

Figure 7:
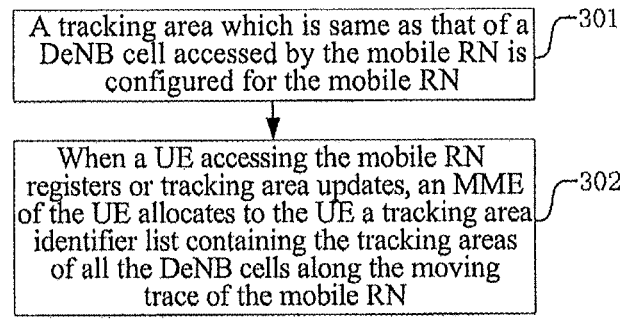
FIG. 7 is a flow chart of an embodiment 3 of the present document.

The present embodiment provides another method for mobile relay tracking area configuration and location update, as shown in FIG. 7, including the following steps:

In step 301, a tracking area same as a DeNB cell accessed by the mobile RN is configured for the mobile RN.

In step 302, when a UE accessing the mobile RN registers or tracking area updates, an MME of the UE allocates to the UE a tracking area identifier list containing tracking areas of all the DeNB cells along the moving trace of the mobile RN.

Preferably, the above-mentioned method further includes: when the mobile RN performs handover to a target DeNB, the mobile RN updating tracking area configuration, to ensure that the tracking area of the mobile RN keeps consistent with the tracking area of the target DeNB.

In the present embodiment, the RN and the DeNB are configured to have the same tracking area, and the tracking area identifier list configured for the UE contains the tracking areas of all the DeNB cells along the moving trace of the mobile RN, therefore, the UE does not perform the location update when the RN moves.

Figure 8:
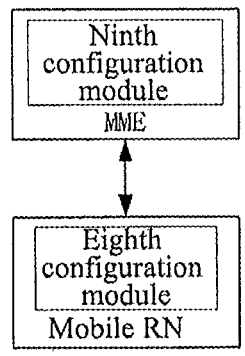
FIG. 8 is a structure diagram of an apparatus of an embodiment 3 of the present document.

The apparatus realizing the above-mentioned method, as shown in FIG. 8, including an eighth configuration module and a ninth configuration module, wherein, the eighth configuration module is configured to configure for a mobile RN a tracking area same as a donor base station (DeNB) cell accessed by the mobile RN; and the ninth configuration module is located in a mobile management entity (MME) of a terminal (UE) accessing the mobile RN, and configured to: when the UE registers or tracking area updates, allocate to the UE a tracking area identifier list containing tracking areas of all the DeNB cells along the moving trace of the mobile RN.

Preferably, the apparatus further includes a tenth configuration module, located in the mobile RN and configured to: when the mobile RN performs handover to a target DeNB, update tracking area configuration of the mobile RN, to ensure that the tracking area of the mobile RN keeps consistent with the tracking area of the target DeNB.

The above-mentioned embodiments are illustrated by several application examples hereinafter.

Application Example 1

Figure 9:
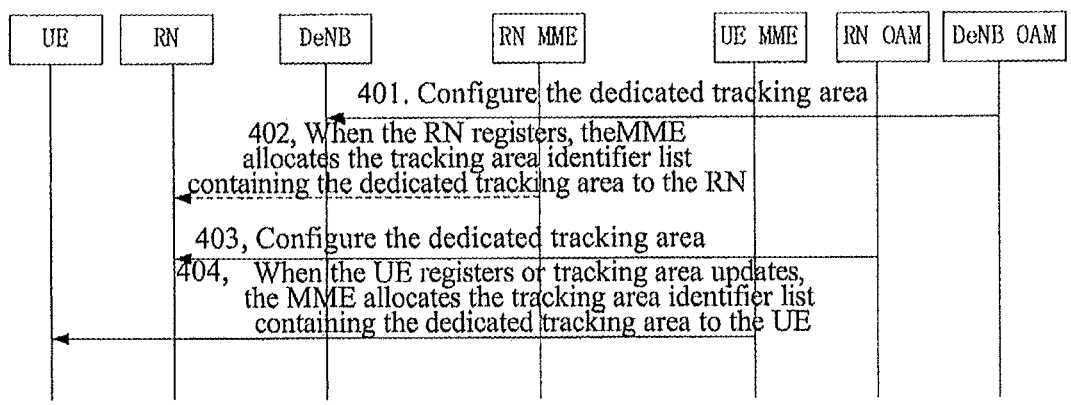
FIG. 9 is a flow chart of an application example 1 of the present document.

The present example is an application example corresponding to the method of the above-mentioned embodiment 1, and the present example places emphasis on that the TA configured for each DeNB cell along the moving trace of the mobile RN is same as the TA configured to each cell of the RN. As shown in FIG. 9, it includes the following steps:

In step 401, the network management system, OAM, of the DeNB configures the dedicated TA for the DeNB which dedicatedly serves the mobile RN;

wherein, the RN obtains the tracking area configuration parameter from the network management system of the RN, and the obtained tracking area configuration parameter corresponds to the dedicated tracking area.

In step 402, when the RN accesses the DeNB to register, the MME of the RN allocates the tracking area identifier list containing the dedicated tracking area for the RN.

The present embodiment supposes that the TA configured for each DeNB cell along the moving trace of the mobile RN is same as the TA configured to each cell of the RN, thus, if the RN obtains the tracking area identifier list at this moment, then it does not need to initiate the location update. In other embodiments, this step also can be not performed, and then the RN needs to perform the location update when performing handover to other DeNBs.

In step 403, after the RN finishes the registration, the RN obtains the tracking area configuration parameter from the network management system, OAM, of the RN, and the tracking area parameter corresponds to the dedicated tracking area.

In step 404, when the RN can work normally and access the UE, and when the accessed UE registers on the network or the tracking area updates, the MME of the UE judges the tracking area information of the cell accessed by the UE currently; if the tracking area is the dedicated tracking area, then the tracking area identifier list allocated by the MME of the UE to the UE includes the dedicated area.

The MME of the UE and the MME of the RN may be the same MME physically, but they are two MMEs logically.

Through the above-mentioned steps 401-404, either the RN or the UE does not need to perform the location update in the process of the RN moving, and the paging information can be routed to the RN and notified to the UE.

Application Example 2

Figure 10:
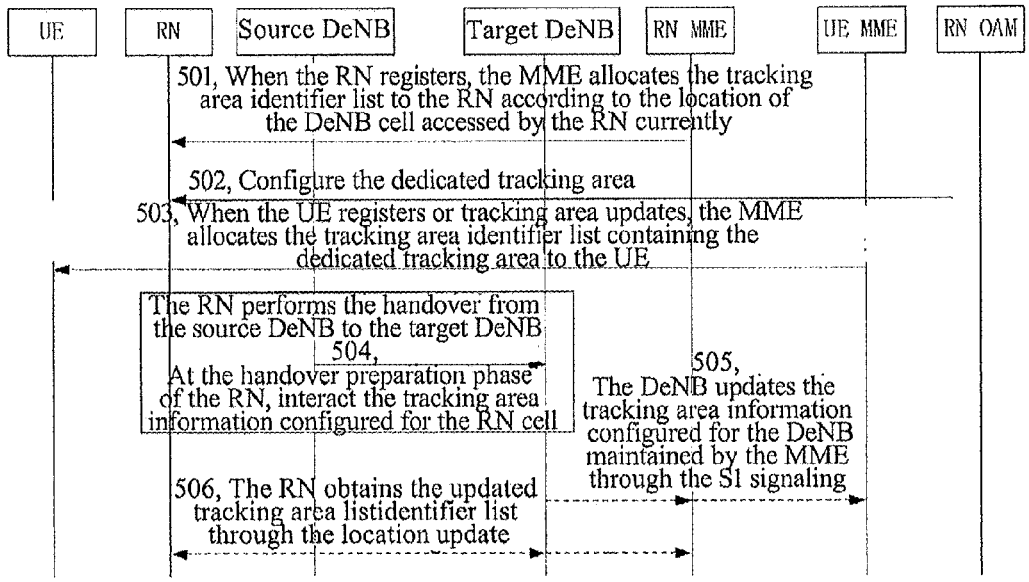
FIG. 10 is a flow chart of an application example 2 of the present document.

The present example is an application example corresponding to the method of the above-mentioned embodiment 2. In the present example, the RN is configured with the dedicated tracking area, and the tracking area identifier list allocated to the UE served by the RN includes the dedicated tracking area, thus it can avoid that the UE performs the location update in the process of the RN moving. However, the present embodiment places emphasis on a scenario that the RN may need to perform the location update in the process of moving when the TA configured for each DeNB cell along the moving trace of the mobile RN is different from the TA configured to each cell of the RN. At this moment, at a handover preparation phase, the tracking area configured for the RN can be interacted between the DeNBs, and then the target DeNB initiates to the connected MME updating the tracking area configuration of the DeNB cell in advance, thereby guaranteeing the correct route of the paging message. As shown in FIG. 10, it includes the following steps:

In step 501, when the RN accesses and registers, the MME of the RN allocates the TAI list to the RN according to the location of the DeNB cell accessed by the RN currently.

In step 502, after the RN finishes registration, it obtains the configuration parameter from the OAM of the RN, and configures the dedicated tracking area for each cell of the mobile RN.

In step 503, when the UE that the RN serves registers or the tracking area updates, the MME of the UE allocates the tracking area identifier list containing the dedicated tracking area to it;

wherein, the MME of the UE can judge the tracking area information of the cell accessed by the UE currently according to the TAI information obtained from an initial UE message; if it corresponds to the dedicated tracking area of the RN, then the tracking area identifier list allocated to the UE includes the dedicated tracking area, in this way, the UE does not need to perform the tracking area update in the process of following the RN moving.

In step 504, when the RN performs handover from the source DeNB to the target DeNB in the process of the RN moving, at the handover preparation phase of the RN, a handover request message that the source DeNB can send to the target DeNB carries the tracking area information configured for the RN acting as the base station.

In step 505, if the tracking area configured for each cell of the target DeNB does not include the dedicated tracking area configured for a certain cell of the RN, then the DeNB needs to send an S1 signaling, such as, an eNB Configuration Update message, etc., to all MMEs in the MME pool area associated with the DeNB, to update the tracking area information configured to the target DeNB recorded by the MME. Similarly, after the RN finishes the handover, if the tracking area configured to each cell of the source DeNB does not include the dedicated tracking area configured to a certain cell of the RN, then the source DeNB needs to send the S1 signaling, such as, the eNB Configuration Update message, etc., to all MMEs in the MME pool area associated with the DeNB, to update the tracking area information configured for the source DeNB recorded by the MME, thereby avoiding that the source DeNB receives an unnecessary paging message.

The present step is suitable for a scenario that the current RN and MME adopt a relay framework 2; under such scenario, the DeNBs which are along the moving trace of the mobile RN and accessed by the mobile RN need to be configured with the same MME pool or an overlapped MME pool, so that the MME allocated by the DeNB to the UE that the RN serves does not need to change in the process of the RN moving, thereby further guaranteeing that the UE that the RN serves does not need to update the tracking area.

When the RN and the MME adopt a relay framework 1, that is, when the RN is connected with the MME directly, then there is no need to update the tracking area information maintained by the MME through the DeNB.

Wherein, when setting up the S1 interface and the X2 interface with the target DeNB, the target DeNB obtains the configuration TAC information of each cell of the RN; if the TA of each cell of the target DeNB does not contain the TA of a certain cell of the RN, then the DeNB needs to send the eNB Configuration Update message to all MMEs in the MME pool area associated with the DeNB, to update the TA information configured for the target DeNB recorded by the MME.

By this way, later the paging message for paging the UE served by the RN can be routed to the DeNB and the RN. The tracking area information configured to the RN cell is interacted between the DeNBs at the handover preparation phase, that is, at the handover preparation phase of the RN, the handover request message that the source DeNB sends to the target DeNB carries the tracking area information configured to the RN which is as a base station, thereby making the target DeNB be able to send the configuration update to the MME in advance and accelerate the MME to update the TAI information configured for the target DeNB, which makes the paging more effective and timely.

In step 506, if the tracking area of the target DeNB cell to which the RN performs handover along the moving trace is not in the tracking area identifier list of the RN, then the RN performs the tracking area update process after finishing the handover, to update the tracking area identifier list.

Application Example 3

Figure 11:
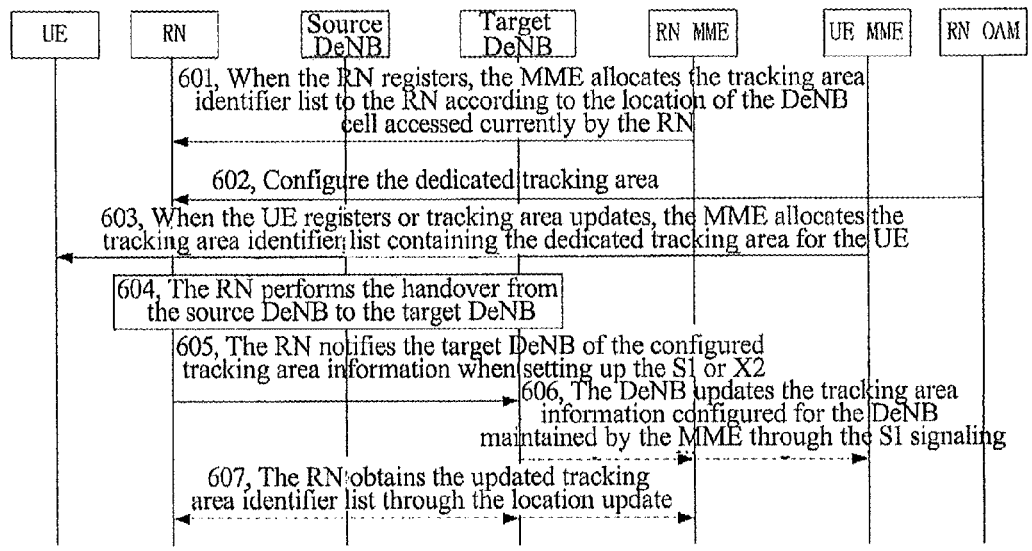
FIG. 11 is a flow chart of an application example 3 of the present document.

The present example is an application example corresponding to the method of the above-mentioned embodiment 2. In the present example, the RN is configured with the dedicated tracking area, and the tracking area identifier list allocated to the UE served by the RN includes the dedicated tracking area, thus it can avoid that the UE performs the location update in the process of the RN moving. However, the present embodiment places emphasis on that the RN may need to perform the location update in the process of moving when the TA configured for each DeNB cell along the moving trace of the mobile RN is different from the TA configured to each cell of the RN. At this moment, after the handover is finished, the RN interacts the tracking area configured for the RN when setting up the S1 or the X2 connection with the target DeNB, and then the target DeNB initiates to the connected MME updating the tracking area configuration of the DeNB cell, thereby guaranteeing the correct route of the paging message. As shown in FIG. 11, it includes the following steps:

In step 601, when the RN accesses and registers, the MME of the RN allocates the TAI list to the RN according to the location of the RN.

In step 602, after the RN finishes registration, it obtains the dedicated tracking area configuration parameter from the OAM of the RN, and configures the dedicated tracking area for each cell of the mobile RN.

In step 603, when the UE that the RN serves registers or the tracking area updates, the MME of the UE allocates the tracking area identifier list containing the dedicated tracking area to it.

Wherein, the MME of the UE can judge the tracking area information of the cell accessed by the UE currently according to the TAI information obtained from an initial UE message; if it corresponds to the dedicated tracking area of the RN, then the tracking area identifier list allocated to the UE includes the dedicated tracking area, in this way, the UE does not need to perform the tracking area update in the process of following the RN moving.

In step 604, the RN performs handover from the source DeNB to the target DeNB in the process of moving.

In step 605, after the RN performs handover from the source DeNB to the target DeNB, when setting up the S1 and the X2 interface with the target DeNB, the target DeNB obtains the configuration tracking area information of each cell of the RN.

In step 606, if the tracking area configured for each cell of the target DeNB does not include the dedicated tracking area configured for a certain cell of the RN, then the DeNB sends the eNB Configuration Update message to all MMEs in the MME pool area associated with the DeNB, to update the TA information configured to the target DeNB recorded by the MME.

Bu this way, later the paging message for paging the UE served by the RN can be routed to the DeNB and the RN.

Similarly, after the RN finishes the handover, if the tracking area configured to each cell of the source DeNB does not include the dedicated tracking area configured to a certain cell of the RN, then the source DeNB needs to send the S1 signaling, such as, the eNB Configuration Update message, etc., to all MMEs in the MME pool area associated with the DeNB, to update the tracking area information configured for the source DeNB recorded by the MME, thereby avoiding that the source DeNB receives an unnecessary paging message.

The present step is suitable for a scenario that the current RN and MME adopt a relay framework 2; under such scenario, the DeNBs which are along the moving trace of the mobile RN and accessed by the mobile RN need to be configured with the same MME pool or an overlapped MME pool, so that the MME allocated by the DeNB to the UE that the RN serves does not need to change in the process of the RN moving, thereby further guaranteeing that the UE that the RN serves does not need to update the tracking area.

When the RN and the MME adopt a relay framework 1, that is, when the RN is connected with the MME directly, then there is no need to update the tracking area information maintained by the MME through the DeNB.

In step 607, if the tracking area of the target DeNB cell to which the RN performs handover along the moving trace is not in the tracking area identifier list of the RN, then the RN performs the tracking area update process after finishing the handover, to update the tracking area identifier list.

Application Example 4

Figure 12:
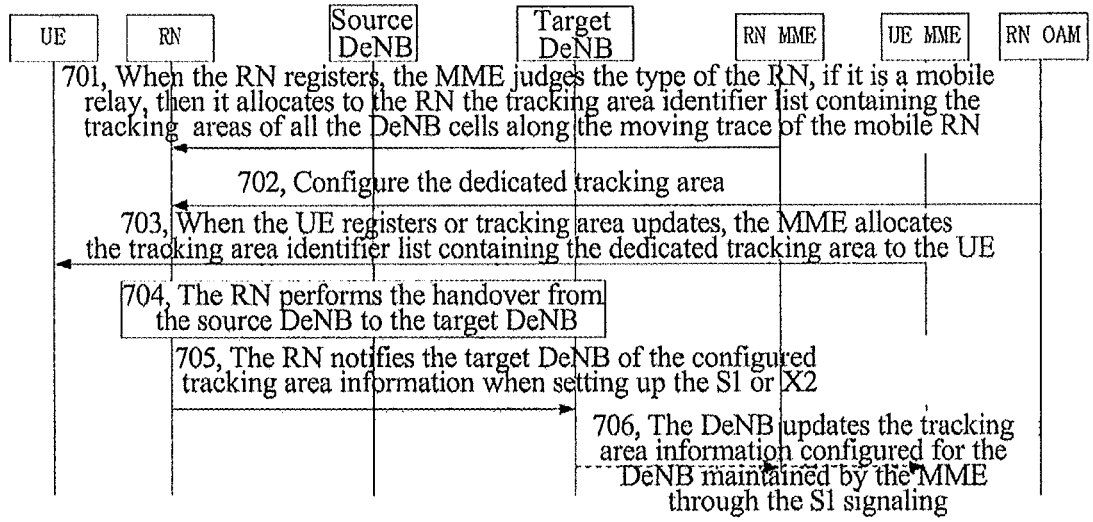
FIG. 12 is a flow chart of an application example 4 of the present document.

The present example is an application example corresponding to the method of the above-mentioned embodiment 2. The difference of the present example and the previous example lies in that the MME of the RN allocates to the RN the tracking area identifier list containing the tracking areas of all the DeNB cells along the moving trace of the mobile RN, thus avoiding that the RN updates the tracking area in the process of moving. As shown in FIG. 12, it includes the following steps:

In step 701, when the RN accesses and registers, the MME of the RN carries a relay type in the access request message; if the relay is a mobile relay, then the MME allocates to the RN the tracking area identifier list containing the tracking areas of all the DeNB cells along the moving trace of the mobile RN.

When the movement track of the mobile RN is fixed, it can acquire in advance the tracking areas of all the DeNB cells along the moving trace of the mobile RN, and the tracking area identifier list is configured for it according to this.

In step 702, after the RN finishes registration, it obtains the dedicated tracking area configuration parameter from the OAM of the RN, and configures the dedicated tracking area for each cell of the mobile RN.

In step 703, when the UE that the RN serves registers or the tracking area updates, the MME of the UE allocates the tracking area identifier list containing the dedicated tracking area to it.

Wherein, the MME of the UE can judge the tracking area information of the cell accessed by the UE currently according to the TAI information obtained from an initial UE message; if it corresponds to the dedicated tracking area of the RN, then the tracking area identifier list allocated to the UE includes the dedicated tracking area, in this way, the UE does not need to perform the tracking area update in the process of following the RN moving.

In step 704, the RN performs handover from the source DeNB to the target DeNB in the process of moving.

In step 705, after the RN performs handover from the source DeNB to the target DeNB, when establishing the S1 and the X2 interface with the target DeNB, the target DeNB obtains the configuration tracking area information of each cell of the RN.

In step 706, if the tracking area configured for each cell of the target DeNB does not include the dedicated tracking area configured for a certain cell of the RN, then the DeNB sends the eNB Configuration Update message to all MMEs in the MME pool area associated with the DeNB, to update the TA information configured to the target DeNB recorded by the MME.

Bu this way, later the paging message for paging the UE served by the RN can be routed to the DeNB and the RN. In addition, it can also adopt the way of interacting the tracking area configured for the RN between the DeNBs at the handover preparation phase in the application example 2, in order to accelerate the process that the MME updates the tracking area of the DeNB.

Similarly, after the RN finishes the handover, if the tracking area configured to each cell of the source DeNB does not include the dedicated tracking area configured to a certain cell of the RN, then the source DeNB needs to send the S1 signaling, such as, the eNB Configuration Update message, etc., to all MMEs in the MME pool area associated with the DeNB, to update the tracking area information configured for the source DeNB recorded by the MME, thereby avoiding that the source DeNB receives an unnecessary paging message.

The present step is suitable for a scenario that the current RN and MME adopt a relay framework 2; under such scenario, the DeNBs which are along the moving trace of the mobile RN and accessed by the mobile RN need to be configured with the same MME pool or an overlapped MME pool, so that the MME allocated by the DeNB to the UE that the RN serves does not need to change in the process of the RN moving, thereby further guaranteeing that the UE that the RN serves does not need to update the tracking area.

When the RN and the MME adopt a relay framework 1, that is, when the RN is connected with the MME directly, then there is no need to update the tracking area information maintained by the MME through the DeNB.

Application Example 5

Figure 13:
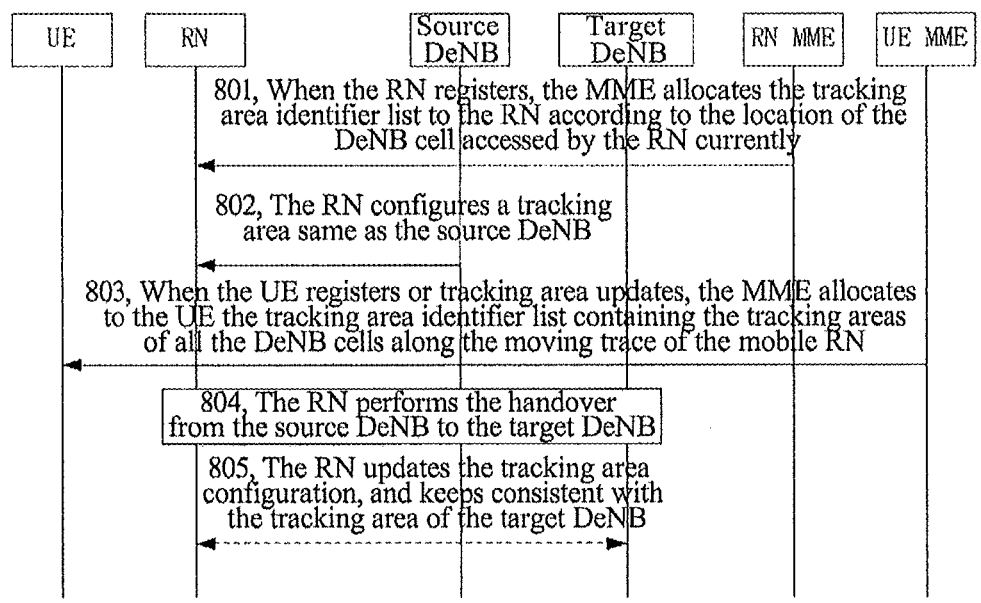
FIG. 13 is a flow chart of an application example 5 of the present document.

The present example is an application example corresponding to the method of the above-mentioned embodiment 3, it is configured that the tracking area of the RN keeps consistent with the tracking area to which the DeNB accessed by the RN belongs, and the tracking area identifier list allocated to the UE that the RN serves includes the tracking area information to which the passed DeNBs belongs, thereby avoiding that the UE performs the location update in the process of the RN moving. In addition, the DeNB does not need to update the tracking area configuration information of the DeNB to the MME as well. But under the above scenario, the RN may need to update the location in the process of moving. As shown in FIG. 13, it includes the following steps:

In step 801, when the RN accesses and registers, the MME of the RN allocates the tracking area identifier list for the RN according to the location of the RN.

In step 802, after the RN finishes the registration, it configures the dedicated tracking area for each cell of the mobile RN according to the tracking area information configured for the accessed DeNB.

In step 803, when the UE that the RN serves registers or the tracking area updates, the MME of the UE judges whether the UE accesses the mobile RN according to an ECGI in an Initial UE Message; if yes, then it allocates to it the tracking area identifier list containing the tracking areas of all the DeNB cells along the moving trace of the mobile RN.

Through the present step, the UE does not need to update the tracking area in the process of following the RN moving.

In step 804, the RN performs handover from the source DeNB to the target DeNB in the process of moving.

In step 805, if the tracking area of the target DeNB cell to which the RN performs handover along the moving trace is not in the tracking area identifier list of the RN, then the RN performs the tracking area update process after finishing the handover, to update the tracking area identifier list.

It can be understood by those skilled in the art that all or part of steps in the above-mentioned method can be fulfilled by programs instructing the relevant hardware components, and the programs can be stored in a computer readable storage medium such as a read only memory, a magnetic disk or an optical disk, etc. Alternatively, all or part of the steps in the above-mentioned embodiments can be implemented with one or more integrated circuits. Accordingly, each module/unit in the above-mentioned embodiments can be implemented in the form of hardware, or in the form of software function module. The present document is not limit to any specific form of the combination of the hardware and software.

Certainly, the present document can have a variety of other embodiments. Those skilled in the art can make the corresponding modifications and variations according to the present document without departing from the spirit and essence of the present document. And all of these modifications or the variations should be embodied in the scope of the appending claims of the present document.

INDUSTRIAL APPLICABILITY

The method and apparatus of the embodiment of the present document try the best to guarantee that the paging area list allocated to the UE includes the tracking area configured for the mobile relay serving the UE, which avoids that numerous UEs served by the RN trigger location update simultaneously in the process of the RN moving. In addition, when the RN performs handover, the tracking area configuration information of each RN or DeNB cell maintained by the MME is updated if necessary, thereby guaranteeing that the TA configuration information of an air interface network keeps consistent, and guaranteeing the correct paging route.

What we claim is:

1. A method for mobile relay node (RN) tracking area configuration and location update, comprising:
   configuring a dedicated tracking area for a Donor eNodeB (DeNB);
   configuring the dedicated tracking area for a mobile RN accessing the DeNB;
   when a terminal (UE) accessing the mobile RN registers or tracking area updates, allocating a tracking area identifier list containing the dedicated tracking area to the UE;
   wherein, the dedicated tracking area is a tracking area code dedicated to a mobile relay; and
   wherein, the allocating a tracking area identifier list containing the dedicated tracking area to the UE comprises:
   a mobile management entity (MME) of the UE determining that a tracking area of a cell accessed by the UE currently is the dedicated tracking area, and then the MIME allocating to the UE the tracking area identifier list containing the dedicated tracking area.

2. The method according to claim 1, wherein, the configuring a dedicated tracking area for a DeNB comprises:
   the DeNB obtaining a tracking area configuration parameter from a network management system of the DeNB, wherein the tracking area configuration parameter corresponds to the dedicated tracking area.

3. The method according to claim 1, wherein, the configuring the dedicated tracking area for a mobile RN comprises:
   the mobile RN obtaining a tracking area configuration parameter from a network management system of the mobile RN, wherein the tracking area configuration parameter corresponds to the dedicated tracking area.

4. A method for mobile relay node (RN) tracking area configuration and location update, comprising:

configuring a dedicated tracking area for a mobile RN served as a base station; wherein, the dedicated tracking area is a tracking area code dedicated to a mobile relay;

when a terminal (UE) accessing the mobile RN registers or tracking area updates, allocating a tracking area identifier list containing the dedicated tracking area to the UE; and when a tracking area configured for each cell of a target donor eNodeB (DeNB) accessed by the mobile RN does not contain the dedicated tracking area configured for the mobile RN, the target DeNB updating tracking area information of the target DeNB maintained by a mobile management entity (MME); and wherein: the allocating a tracking area identifier list containing the dedicated tracking area to the UE comprises:

the MME of the UE determining that a tracking area of a cell accessed by the UE currently is the dedicated tracking area, then allocating by the MME to the UE the tracking area identifier list containing the dedicated tracking area.

5. The method according to claim 4, further comprising:
at a handover preparation phase of the mobile RN, a source DeNB sending tracking area information configured for the mobile RN to the target DeNB; or,
the mobile RN sending tracking area information configured for the mobile RN to the target DeNB when setting up an S1 interface or an X2 interface.

6. The method according to claim 4, further comprising:
when the mobile RN registers as a terminal identity, the MME allocating a tracking area identifier list to the mobile RN by adopting one of the following ways:
the MME allocating the tracking area identifier list to the mobile RN according to a location of a DeNB accessed by the mobile RN currently; or,
the tracking area identifier list allocated by the MME to the mobile RN containing the configured tracking areas of all the DeNB cells along the moving trace of the mobile RN.

7. The method according to claim 6, wherein:
the DeNBs that are along the moving trace of the mobile RN and accessed by the mobile RN are configured with a same MME pool or an overlapped MME pool.

8. A method for mobile relay node (RN) tracking area configuration and location update, comprising:
configuring for a mobile RN a tracking area same as a donor base station (DeNB) cell accessed by the mobile RN; and
when a terminal (UE) accessing the mobile RN registers or tracking area updates, a mobile management entity (MME) of the UE determining that the UE accesses the mobile RN, and allocating to the UE a tracking area identifier list containing tracking areas of all the DeNB cells along the moving trace of the mobile RN.

9. The method according to claim 8, further comprising:
when the mobile RN performs handover to a target DeNB, the mobile RN updating tracking area configuration, to ensure that the tracking area of the mobile RN keeps consistent with the tracking area of the target DeNB.

10. An apparatus for mobile relay node (RN) tracking area configuration and location update, comprising a first configuration module, a second configuration module and a third configuration module, wherein,
the first configuration module, which is located in a Donor eNodeB (DeNB), is configured to configure a dedicated tracking area for the DeNB;

the second configuration module, which is located in a mobile RN, is configured to configure the dedicated tracking area for the mobile RN accessing the DeNB;

the third configuration module, which is located in a mobile management entity (MME) of a terminal (UE) accessing the mobile RN, is configured to, when the UE accessing the mobile RN registers or tracking area updates, allocate a tracking area identifier list containing the dedicated tracking area to the UE by adopting the following way: determining that the tracking area of a cell accessed by the UE currently is the dedicated tracking area, and then allocating to the UE the tracking area identifier list containing the dedicated tracking area;

wherein, the dedicated tracking area is a tracking area code dedicated to a mobile relay.

11. The apparatus according to claim 10, wherein,
the first configuration module is configured to configure the dedicated tracking area for the DeNB by adopting the following way: obtaining a tracking area configuration parameter from a network management system of the DeNB, wherein, the tracking area configuration parameter corresponds to the dedicated tracking area.

12. The apparatus according to claim 10, wherein:
the second configuration module is configured to configure the dedicated tracking area for the RN by adopting the following way: obtaining a tracking area configuration parameter from a network management system of the RN, wherein, the tracking area configuration parameter corresponds to the dedicated tracking area.

13. An apparatus for mobile relay node (RN) tracking area configuration and location update, comprising a fourth configuration module, a fifth configuration module and an update module, wherein,
the fourth configuration module, which is located in a mobile RN, is configured to configure a dedicated tracking area for a mobile RN served as a base station; wherein, the dedicated tracking area is a tracking area code dedicated to a mobile relay;

the fifth configuration module, which is located in a mobile management entity (MME) of a terminal (UE) accessing the mobile RN, is configured to: when the UE accessing the mobile RN registers or tracking area updates, allocate a tracking area identifier list containing the dedicated tracking area to the UE by the following way: determining that a tracking area of a cell accessed by the UE currently is the dedicated tracking area, and then allocating to the UE the tracking area identifier list containing the dedicated tracking area; and the update module, which is located in a target Donor eNodeB (DeNB), is configured to: when determining that a tracking area configured for each cell of the target DeNB accessed by the mobile RN does not contain the dedicated tracking area configured for the mobile RN, update tracking area information of the target DeNB maintained by the MME.

14. The apparatus according to claim 13, wherein, the update module comprises an information obtaining unit, a judgment unit and an update unit, wherein,
the information obtaining unit is configured to acquire tracking area information configured for the mobile RN by adopting the following way: at a handover preparation phase of the mobile RN, acquiring the tracking area information configured for the mobile RN from a source DeNB; or, obtaining the tracking area information of the mobile RN from the mobile RN when setting up an S1 interface or an X2 interface by the mobile RN;

the judgment module is configured to: according to the information obtained from the information obtaining unit, judge whether the dedicated tracking area configured for each cell of the target DeNB accessed by the mobile RN contains the tracking area configured for the mobile RN; and the update unit is configured to: when the judgment module determines that the tracking area configured for each cell of the target DeNB accessed by the mobile RN does not contain the dedicated tracking area configured for the mobile RN, make the target DeNB update the tracking area information of the DeNB maintained by the MME.

15. The apparatus according to claim 13, wherein, the apparatus further comprises a sixth configuration module, which is located in the MME and configured to: when the mobile RN registers as a terminal identity, allocate a tracking area identifier list to the mobile RN by adopting one of the following ways:

allocating the tracking area identifier list to the mobile RN according to a location of a DeNB accessed by the mobile RN currently; or, the tracking area identifier list allocated to the mobile RN containing the configured tracking areas of all the DeNB cells along the moving trace of the mobile RN.

16. An apparatus for mobile relay node (RN) tracking area configuration and location update, comprising an eighth configuration module and a ninth configuration module, wherein, the eighth configuration module, which is located in a mobile RN, is configured to configure for the mobile RN a tracking area same as a donor base station (DeNB) cell accessed by the mobile RN; and the ninth configuration module, which is located in a mobile management entity (MME) of a terminal (UE) accessing the mobile RN, is configured to: when the UE registers or tracking area updates, determine that the UE accesses the mobile RN, and allocate to the UE a tracking area identifier list containing tracking areas of all the DeNB cells along the moving trace of the mobile RN.

17. The apparatus according to claim 16, wherein, the apparatus further comprises a tenth configuration module, located in the mobile RN and configured to: when the mobile RN performs handover to a target DeNB, update tracking area configuration of the mobile RN, to ensure that the tracking area of the mobile RN keeps consistent with the tracking area of the target DeNB.

* * * * *